July 5, 1927.

J. E. PYNE 1,634,512

VALVE SEAT AND HEAD

Filed Sept. 2, 1925

Inventor
James E. Pyne
By Owen Owen Crampton
Attorney

Patented July 5, 1927.

1,634,512

UNITED STATES PATENT OFFICE.

JAMES E. PYNE, OF TOLEDO, OHIO.

VALVE SEAT AND HEAD.

Application filed September 2, 1925. Serial No. 53,985.

My invention has for its object to provide substantially permanent valve parts that control the passage way through a valve structure that will more closely seal as imperceptible wearing occurs. Thus the valve parts are so constructed that they may readily be placed in position in a valve structure and will not vibrate as the fluid passes through the valve.

As is well known in connecton with valve structures, soft fibrous or metallic washers are used to seal the passage way through valves, but owing to the fact that the valves are commonly used in connection with liquids or gases that cause deterioration of such materials replacement is soon required. Also when used in connection with hot liquids there is expansion followed by cooling and contraction with the result that although the valve is tightly closed it will leak, also subjecting the washers to light pressure while hot soon presses them out of shape. This requires replacement of such constructions to maintain the valve in the condition such that it may seal the passage way through the valve. Also repeated opening and closing of the valve causes wear in the valve seats or washers with a result that the valve soon leaks and permits the flow of liquids or gases and also causes vibration of the movable valve members and consequently vibration or hammering of the water and gases.

The invention thus may be used for closing and opening the passage way through pipes used for the transfer of liquids and gases of any kind, and also may be used in connection with valves of different forms. To illustrate a practical application of the invention I have selected a bib in which a valve seat and head embodying my invention are located. The valve selected as an example of structures containing the invention is shown in the accompanying drawing, and is described hereinafter.

Figure 1:
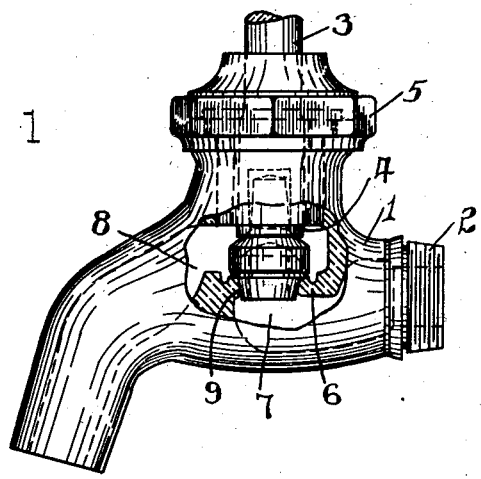
Figure 2:
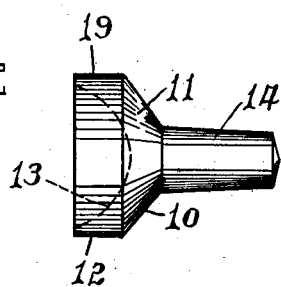
Figure 3:
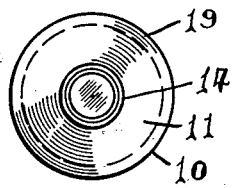
Figures 4, 5:
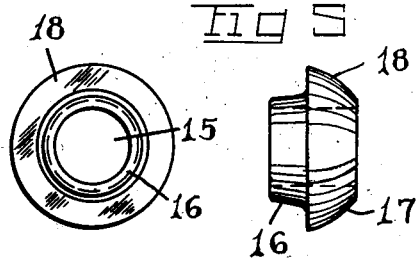
Figure 6:
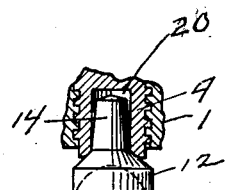

Figure 1 of the drawing illustrates a side view of a bib shown partly broken away to illustrate the valve parts. Fig. 2 is a side view of the valve head. Fig. 3 is a top view of a valve head. Fig. 4 is a bottom view of the valve seat. Fig. 5 is a side view of the valve seat. Fig. 6 is a view of a section showing the relative shapes of the movable valve member and its supporting part.

In the ordinary construction of valves a threaded member is provided which when rotated will open or close the valve according to the direction of its rotation. When it is rotated to close the valve the member ordinarily is seated against a ridge or rib or flange that surrounds the inlet of the valve. By my invention I have provided a means whereby the parts that are thus brought into sealing contact may be readily attached to the valve parts. Thus in the form of construction shown in the drawing the threaded member may be readily bored to receive the valve stem of the head and the inlet of the valve will receive the valve seat so that by a slight modification of the valve commonly used in connection with water supply systems, such as in homes, the ordinary bib may be readily modified to receive the parts embodying my invention.

The bib 1 of the drawing is provided with the usual tapered threaded portion 2 for connecting it with the ordinary house pipe commonly used in connection with water supply systems. The bib is provided with the usual shank 3 that is connected to the threaded block 4 that threads into the valve casing or shell. It also has the packing nut 5 that is threaded on to the shell or casing of the valve for forcing packing material around the shank 3 of the valve. The interior of the bib is provided with a separating wall 6 that divides the valve into the two chambers 7 and 8. The partitioning wall has an opening 9 which is controlled by the valve to open and close the passage way through the valve, that is, through the chambers 7 and 8. In order to produce a substantially permanent means for closing the valve notwithstanding the frequency of its use, I have provided a valve seat and valve head that may be readily connected to the valve parts of the type described and which is found in practically all valves.

The part designated as the movable valve member or head is shown somewhat enlarged in Figs. 2 and 3. It is provided with a head 10 having the conical surface 11, the cylindrical surface 12, and an inner substantially spherical surface 13. A tapered stem 14 protrudes from the head 10 while the block 4 is provided with a cylindrical recess 20 that has a depth greater than the length of the stem and a diameter mechanically the same as the stem 14 at its base. Furthermore, the end of the block 4 may be reamed to form a narrow annular portion that fits the conical surface 11. The valve seat, shown in Figs. 4 and 5, has an opening 15, an exterior conical surface 16 and a spherical surface 17 which substantially fits the spherical surface 13 of the stem part. The conical surface 16 is so formed that it will wedge into the opening 9 of the partitioning wall 6 and thus the seat may be secured in the bib.

In assembling the parts, the block 14 is removed from the bib and is bored. The valve seat 18 is forced into the opening 9 to secure it in position. The movable valve member is then placed on the seat and the block 4 is replaced in the bib, the stem 14 entering the central bore formed in the block 4. When the water or other liquid or gas is turned on to the bib, the large area of contact between the spherical surfaces 13 and 17 tightly seals the valve, the conical stem permitting a sufficient play to cause the parts to seal when it is closed. When it is opened the pressure of the moving liquid or gas holds the stem part up within and against the block 4. The shortness of the stem 14 and its shape prevents vibration of the movable valve part.

The stem and valve seat may be formed of any suitable metal or alloy. Preferably it is formed of a hard rust proof and non-corrosive metal or alloy of metals. The large area of contact afforded by the spherical surfaces gives an exceedingly long life to the valve parts as well as affords means for effectively sealing the valve. Also owing to the fact that the stem 14 is mounted for free movement within the block 4 it will ordinarily take different positions on the valve seat each time that it is closed and the movable valve member does not vibrate when a fluid is passing through the valve.

I claim:

In a valve, a partitioning wall having an opening, a valve seat having a conical flange tightly press fitting the opening and having a spherical surface, a threaded block rotatably supported in the valve and having a central bore, a movable valve member having a spherical surface fitting the spherical surface of the valve seat and a conical stem, the base of the conical stem contacting with the block and having a diameter substantially equal to the diameter of the bore, the said stem having a length less than the depth of the bore.

In testimony whereof I have hereunto signed my name to this specification.

JAMES E. PYNE.